United States Patent [19]

Driemeyer

[11] 4,318,736
[45] Mar. 9, 1982

[54] METHOD FOR MANUFACTURING STEEL FROM IRON ORE DUST BY DIRECT REDUCTION

[75] Inventor: Manfred Driemeyer, Issum, Fed. Rep. of Germany

[73] Assignee: Mannesmann DeMag AG, Duisburg, Fed. Rep. of Germany

[21] Appl. No.: 83,387

[22] Filed: Oct. 10, 1979

[51] Int. Cl.³ .............................................. C21B 11/10
[52] U.S. Cl. .................................... 75/38; 75/11; 75/40
[58] Field of Search ............................ 75/11, 38, 40

[56] References Cited

U.S. PATENT DOCUMENTS

| | | | |
|---|---|---|---|
| 1,459,187 | 6/1923 | Pratt | 75/40 |
| 2,951,756 | 9/1960 | Cavanagh | 75/40 |
| 3,140,168 | 7/1964 | Halley | 75/40 |
| 3,862,834 | 1/1975 | Von Waclawiczek et al. | 75/11 |
| 3,963,483 | 6/1976 | Mathesius et al. | 75/38 |
| 3,997,333 | 12/1976 | Fey | 75/11 |
| 4,045,214 | 8/1977 | Wetzel et al. | 75/38 |

FOREIGN PATENT DOCUMENTS

| | | | |
|---|---|---|---|
| 442776 | 4/1927 | Fed. Rep. of Germany | 75/40 |
| 1048030 | 4/1960 | Fed. Rep. of Germany | 75/40 |
| 2116445 | 2/1973 | Fed. Rep. of Germany | 75/40 |
| 2424932 | 4/1976 | Fed. Rep. of Germany | 75/40 |
| 2401909 | 8/1978 | Fed. Rep. of Germany | 75/40 |

Primary Examiner—M. J. Andrews
Attorney, Agent, or Firm—Mandeville and Schweitzer

[57] ABSTRACT

The invention relates to methods and apparatus for manufacturing steel from iron ore dust by direct reduction. The iron ore dust is preheated, then reduced with a gas mixture contaning monoxide. Thereafter, the reduced product is charged by means of a gaseous aid or adjuvant into an iron smelt below the bath surface.

6 Claims, 1 Drawing Figure

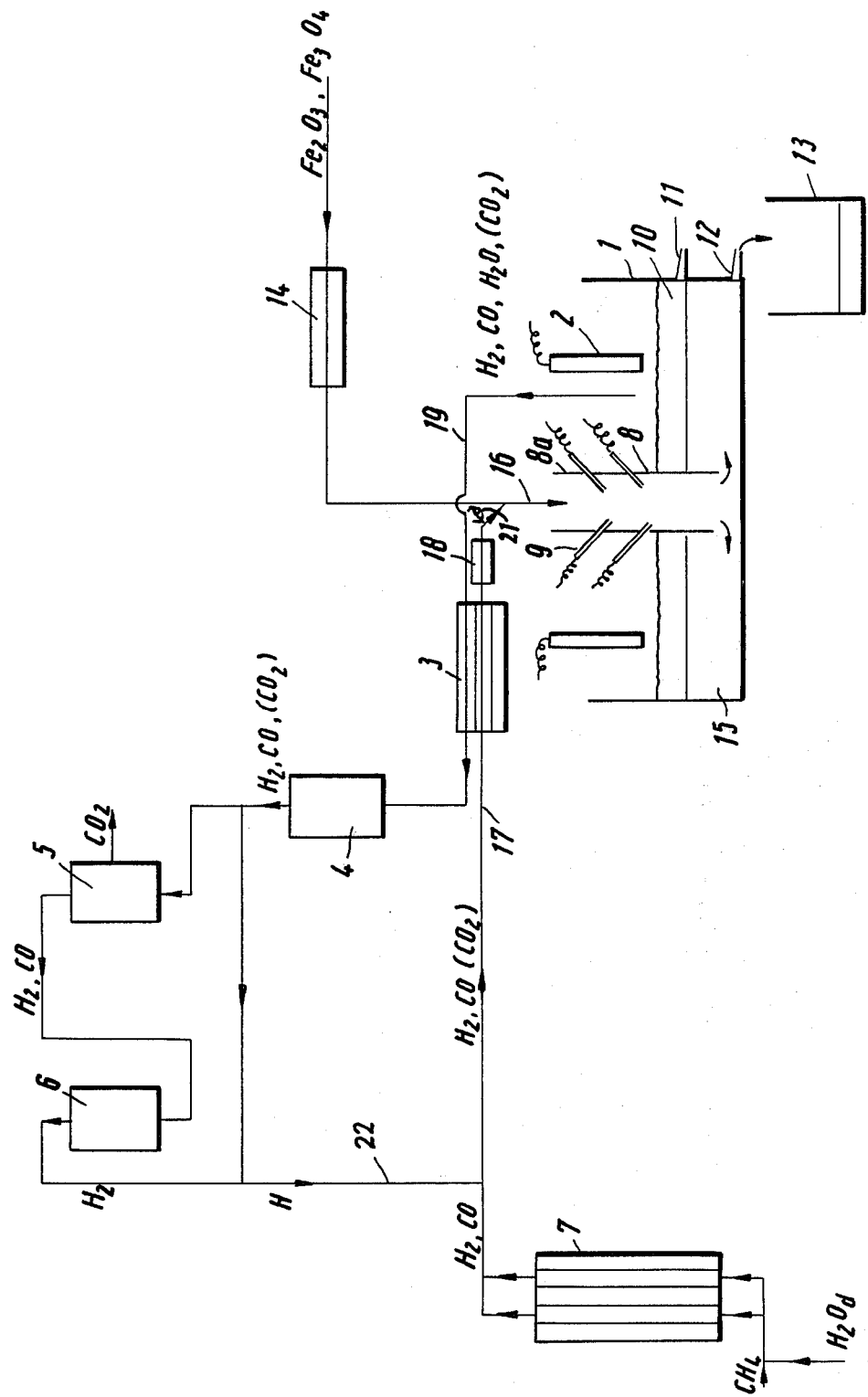

METHOD FOR MANUFACTURING STEEL FROM IRON ORE DUST BY DIRECT REDUCTION

BACKGROUND AND STATEMENT OF THE INVENTION

German DE-AS 24 01 090 discloses a method for manufacturing steel from fine-grained iron ores. In that method, the preheated and partially reduced iron ore is reduced to iron sponge in a counter-flow current with gases consisting almost exclusively of carbon monoxide in a vortex reactor at 500 to 850° C. The iron sponge is delivered pneumatically from the vortex reactor to a smelting furnace in such a way that it is charged into the iron smelt with a multiple jet cap arranged below the surface of the bath.

Three reactors are required to carry out this method. One is for pre-reduction, one for reduction (in the vortex process), as well as one for smelting. This procedure entails problems, particularly the problem of transporting the prereduced material, which has a tendency to reoxidize, as well as the risk of collapse during the direct reduction.

The present invention decreases the number of steps required in the process for direct manufacture of steel from iron ore dust by direct reduction. Furthermore, the disturbances occurring presently caused particularly by the reoxidation of the prereduced material and/or by collapsing of the material during the direct reduction, are eliminated. Another achievement of the invention is the reduction of the number of installation parts, and the simplification of transport between the individual installation parts. This is solved by the method for manufacturing steel from iron ore dust by direct reduction, whereby the iron ore dust is preheated, then reduced with a gas mixture containing monoxide and the reduction product is charged into an iron smelt below the surface of the bath, distinguished in that the iron dust is introduced into a reducing gas in a continuous current, which is preheated to about 400° to 800° C., containing predominantly $H_2$ and at the same time serving as adjuvant, and immediately upon this introduction it is delivered through a reduction duct going almost to the bottom of a smelting aggregate, whose interior is heated to 1,000° to 1,400° C., after which the metallic iron spontaneously reduced from the iron ore dust, following the delivery of the adjuvant gas current and the free fall, is transformed to the molten state in the iron smelt present in the smelting vessel. Advantageous further developments of the invention are contained in the dependent claims.

In the method of the invention, a gas mixture of about 300° C. and rich in $H_2$ is heated, recuperatively, from the waste or exhaust gases of an iron smelting aggregate to about 700° C., and fed to a reducing duct. Immediately before admitting the gas mixture into the upper portion of this reducing duct arranged in the furnace chamber of an iron smelting aggregate, microfine ground ore is added to the gas current. In the reaction duct, the lower end of which is immersed in a molten Fe metal bath, the solid-gas-mixture is heated to about 1,200° C. so that it is practically spontaneously reduced from reduction gas to metallic iron. Subsequently, the iron, following the gas current and/or the free fall, is pressed into the molten phase together with the gas mixture, where it is transformed into the molten state.

The metal bath is supplied with energy in order to avoid cooling of the molten iron by the solid-gas-mixture entering the molten phase, where the temperature is below the liquidus temperature of the iron. Furthermore, it is supplied to compensate for the temperature loss of possibly occurring tail reactions of the endothermal reduction processes taking place via hydrogen, and finally to compensate for the radiation losses of the smelt bath.

The waste gas emerging from the metal bath, consisting of the components $H_2$, $CO$, $H_2O$, $CO_2$, is immediately upon issuing from the smelting aggregate, fed to the reducing gas for recuperative heat exchange. Following that the waste gas is dried and, as a rule, fed again directly to the process. In order to balance the loss of the gas components oxidized by the reducing process, the process is to be supplied at all times with fresh, live gas, which may, for example, be supplied from natural gas and water vapor in a gas transformer. The mixed gas is mixed with the reconditioned gas from the process, recuperatively heated, mixed with iron ore dust, and fed to the reduction duct.

For this method of the invention, the usual safety measures for preventing explosions must, of course, be taken, which are required for processes where a reducing gas containing $H_2$ is used. Above all, all parts of the installation must be gas proof.

The method of the invention is distinguished by the fact that steel is manufactured from ore in one step, whereby the reducing potential of hydrogen, which is favorable for high temperatures, is utilized. There is almost no metallurgic work done in the smelting aggregate. Only a separation of the metallic iron from the oxidic matrix takes place here. The smelting aggregate is provided with two tap holes, which are located in the usual manner at different levels in order to tap metal and slag separately. Also, the method of the invention makes it possible to reduce the number of the usual steps in the process; the transport distances between the individual parts of the installation are thus shortened.

EXAMPLE

In order to manufacture one ton of iron from, e.g. hematite iron ore, 1,430 tons of $Fe_2O_3$ and 602 $Nm^3$ (normal cubic meters) $H_2$ are required. With reference to the reduction temperature of 1,200° C., one ton Fe requires 3,250 $Nm^3$ $H_2$. To manufacture, for example 30 (tons) Fe, with reference to a reduction temperature of 1,200° C., 97,500 $m^3$ $H_2$ are required for the reduction of $Fe_2O_3$ to metallic iron. The theoretic thermodynamic efficiency of the reduction of iron ores to metallic iron by means of $H_2$ at 1,200° C. amount to $\eta$ theor., $H_2$, 1,200° C.=0.43. Thus, only 43% of the hydrogen present may be utilized in the reduction to metallic iron, in the most favorable case. At an efficiency of $\eta$ theor., $H_2$, 1,200° C.=0.30 325,000 $m^3$ of $H_2$ were required to manufacture 30 t Fe from $Fe_2O_3$ at 1,200° C. This corresponds to a gas quantity of 60,235 $Nm^3$ of $H_2$, with reference to the standard.

At a gas utilization rate of $\eta$ theor., $H_2$, 1,200° C.=0.30, then 70%, or 42,000 $Nm^3$ $H_2$ were processed in a cycle. Accordingly, approximately 18,000 $Nm^3$ $H_2$/30 t Fe had to be freshly fed to the process, making up the design data for the gas transformer, together with the output of the smelting aggregate. In the gas transformer, natural gas and water vapor were converted into the reducible components $H_2$ and $CO$, according to the conversion reaction $CH_2+H_2O_2=3 H_2+CO$.

The freshly produced reducing gas, therefore, consists of three volume parts $H_2$ and one volume part CO. Since the fresh gas share makes up approximately 30% of the total gas volume, the share of CO of the total gas volume computes to 7.5%. The thermodynamic efficiency of the reduction of iron oxides via the CO phase is considerably less at a temperature of 1,200° C., than via the $H_2$ phase $\eta$ (theor., CO, 1,200° C. = 0.22). Due to the low share of CO gas in the total reducing gas (approx. 7.5%), the high efficiency of the reducing gas at a reduction temperature of about 1,200° C. was hardly affected.

By repeated use of 70% of the total gas volume, the gas gradually became enriched with CO and $CO_2$. It was therefore necessary to subject the reconditioned gas after another gas cycle to a $CO/CO_2$ bath in order to obtain the loose reduction potential of the gas.

DESCRIPTION OF THE DRAWING

The method of the invention is explained in detail by means of the drawing which represents, schematically, an example of the apparatus to carry out the method.

DETAILED DESCRIPTION OF THE INVENTION

The direct reduction of the ore dust takes place in a solid-gas-flow reactor formed by a tubular reduction duct 8 penetrating into a smelting aggregate (light arc furnace 1) and almost touching the bottom of the light arc furnace. The lower end of duct 8 is immersed in the molten iron bath 15. The duct 8 is provided with a refractory lining, and is heated to about 1,000° to 1,400° C. by means of electrodes 9 arranged in the duct wall and protruding into the duct 8. In the upper area 8a of the duct 8, a conduit 16, which runs vertically in the last section, empties into the duct 8 for the delivery of iron ore dust.

In the vertical section of conduit 16 above the reduction duct 8 a conduit 17 discharges the reducing gas, at an acute angle 21. Just before the discharge point, a gas compressor 18 is provided in conduit 17 for delivering the reducing gas through the last section of conduit 17 and/or 16. The ore dust moving in free fall through the vertical section of conduit 16 is added to the gas current so that the solid, as well as the gaseous phase, enter the reduction duct 8 in a continuous current.

The iron ore is reduced substantially spontaneously here to metallic iron at a temperature of about 1,200° C. Subsequentially, following the gas current and/or free fall, the iron is pressed together with the gas mixture into the molten phase 15 present at the bottom of the vessel where it is transformed into the molten state. The metal bath 15 is supplied with energy via electrodes 2 in order to avoid, above all, any cooling of the molten iron by the solid-gas mixture entering the molten phase, whose temperature is below the liquidus or melting point temperature of the iron. Furthermore, the energy supply balances the temperature loss of possibly occurring tail reactions of the reducing processes taking place via $H_2$. Finally, the energy supply compensates for the radiation losses of the smelting bath.

There is a slag layer 10 in the light arc furnace 1 above the smelting bath 15. In the area of the slag layer 10, there is a slag tap hole 11. In the area of the smelting bath 15, a metal tap hole 12 is provided. The metallic iron is tapped into a ladle 13 to which may be added carbon carriers and/or alloying elements, as required.

The iron ore ($Fe_2O_3$, $Fe_3O_4$) is ground microfine in the ore mill 14 and—as already described, delivered into the reduction duct through conduit 16.

The following gas cycle is provided for the installation: The spent gas emerging from the light arc furnace 1 consisting of the components $H_2$, CO, $H_2O$ and $CO_2$ which is conducted through conduit 19, is conveyed to the reducing gas for recuperative heat exchange in the recuperator 3 immediately upon leaving the furnace 1. Subsequently, the waste gas is dried in the drier 4 and, as a rule, returned to the reduction process. The gas which has been slowly enriched with CO and $CO_2$ is subjected to a bath in a $CO_2$ washer 5, as well as in a CO washer 6 in order to obtain the reduction potential of the gas. In order to compensate for the loss of the gas components oxidized through the reduction process, the process is supplied at all times with fresh gas which is secured in a gas transformer 7 from natural gas and water vapor. The fresh gas is mixed with the reconditioned gas from the process in duct 22, heated in the recuperator 3, mixed with iron ore dust fed into the reduction duct 8.

I claim:

1. A method for manufacturing steel by the direct reduction of iron ore dust, comprising the steps of;
   (a) utilizing a single reaction vessel containing an iron smelt of molten iron and slag and a heated tubular reduction duct extending both above said iron smelt and extending below said molten iron smelt;
   (b) preheating the iron ore dust;
   (c) preheating a gas mixture, serving both as a reducing agent and a transport adjuvant; to a temperature within the range of between about 400° to 800° C., said gas mixture comprising carbon monoxide and predominantly $H_2$;
   (d) mixing said preheated gas mixture with said preheated iron ore dust to obtain a gas mixture with entrained iron ore dust;
   (e) heating said gas mixture with entrained iron ore dust in said tubular reduction duct extending above said reaction vessel to a temperature within the range of about 1000° to 1400° C. to thereby utilize the high reduction potential of high temperature $H_2$ thereby causing spontaneous reduction in said tubular reduction duct of said iron ore dust to metallic iron;
   (f) charging said metallic iron and gas mixture into said reaction vessel below the molten surface of said molten iron located in said reaction vessel, thereby transforming said metallic iron into the molten liquid phase; and
   (g) tapping said molten liquid phase into a separate vessel for further metallurgical processing into steel.

2. A method for manufacturing steel as claimed in claim 1, wherein said charging of said metallic iron and said gas mixture is vertically downwardly into said iron smelt.

3. A method for manufacturing steel as claimed in claim 1, further comprising:
   (a) said steps (e) and (f) of claim 1 producing waste gases;
   (b) recovering said waste gases emerging from said molten iron and slag; and
   (c) utilizing the heat of said recovered waste gases to preheat said gas mixture.

4. A method for manufacturing steel as claimed in claim 3, further comprising (a) producing a fresh supply of gas mixture from natural gas and water vapor;

(b) drying and washing said recovered waste gases; and (c) mixing said fresh supply of gas mixture with the dried and washed products of said recovered waste gases prior to said preheating of said gas mixture.

5. A method for manufacturing steel as claimed in claim 4, further comprising (a) said washing of said dried waste gases is accomplished by using $CO_2$ and CO.

6. A method for manufacturing steel as claimed in claim 1, further comprising (a) said gas mixture contains said carbon monoxide in an amount within the range of about 5 to 10% by volume.

* * * * *